Figure 1:
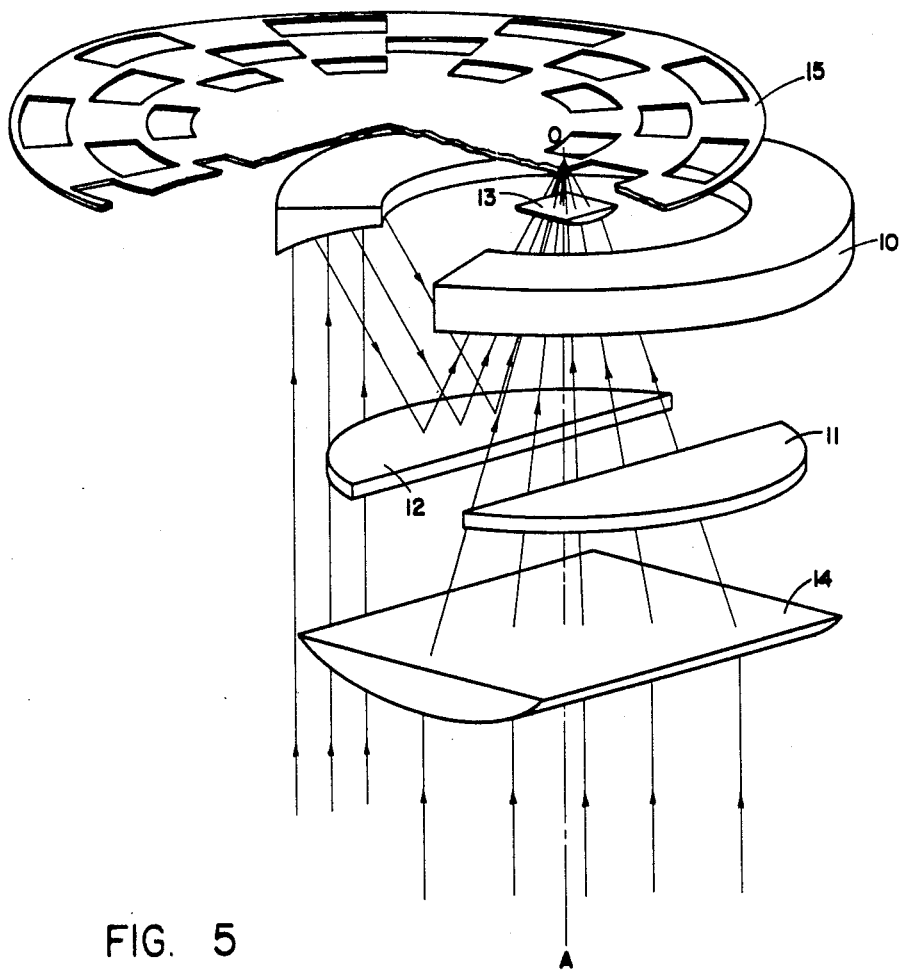

Nov. 23, 1965     J. E. KILLPATRICK     3,219,642

INFRA-RED VIEWING SYSTEM

Filed Dec. 20, 1961     5 Sheets-Sheet 1

*Can be used to detect a star*

INVENTOR.
JOSEPH E. KILLPATRICK

BY *George ...*

ATTORNEY.

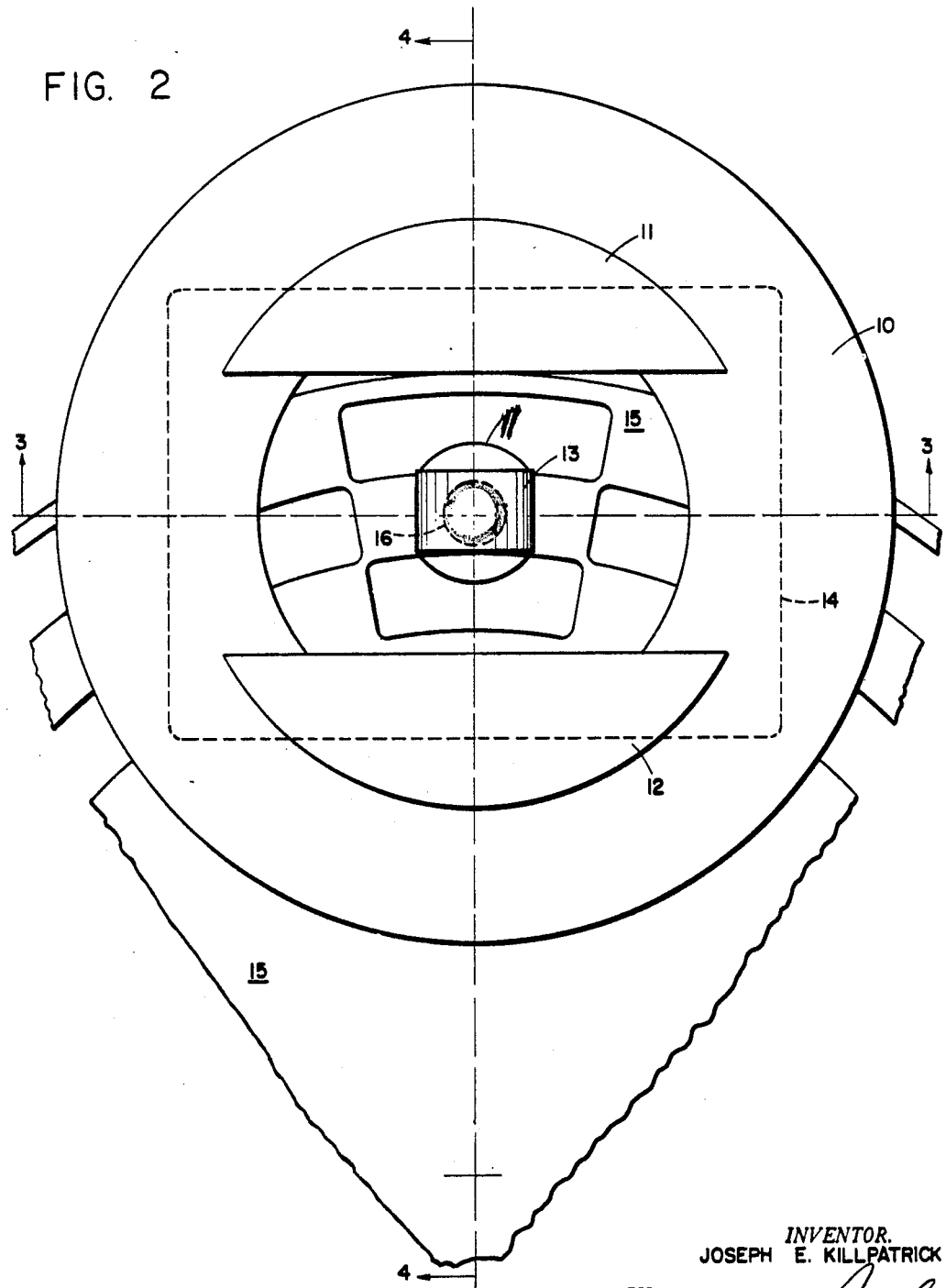

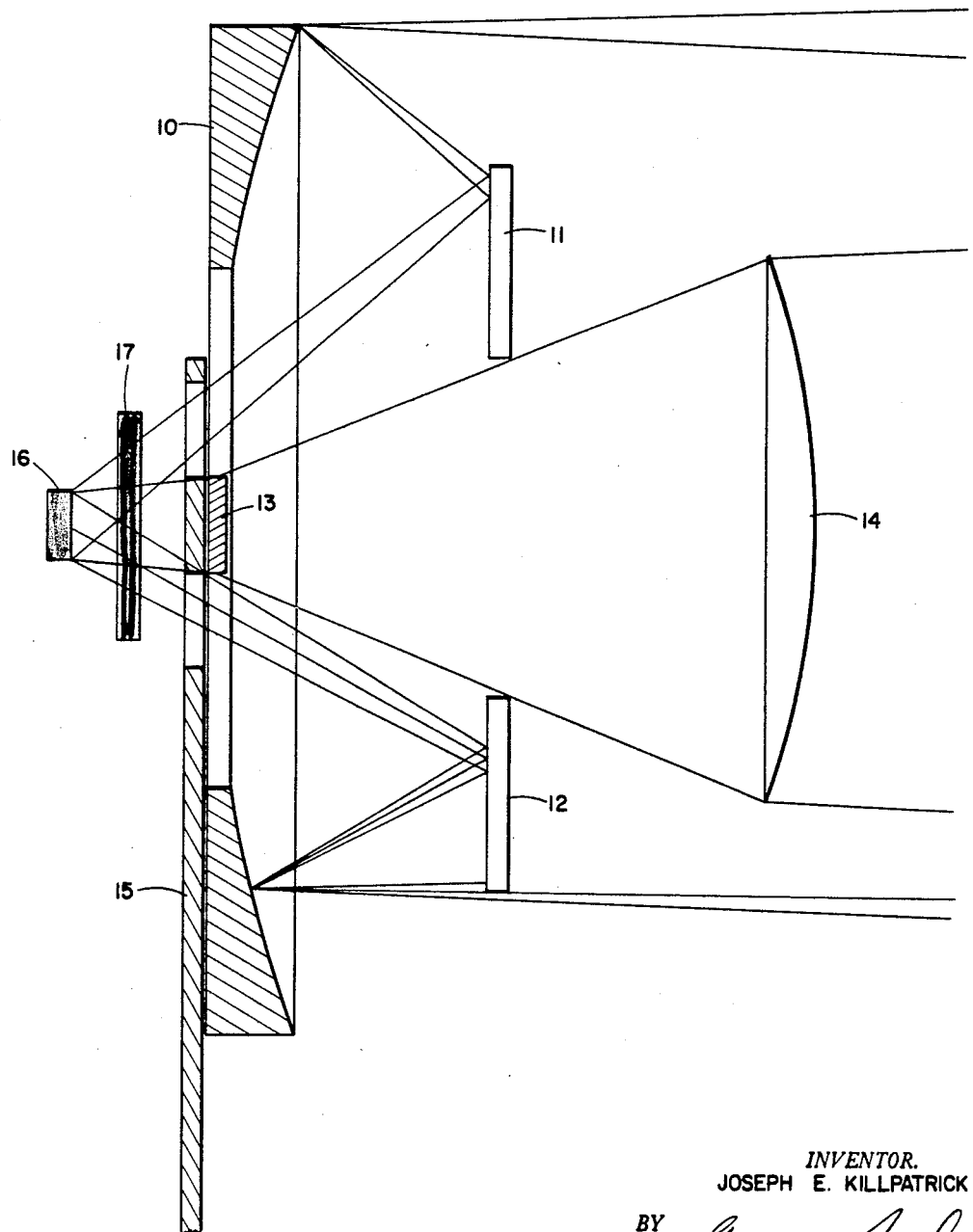

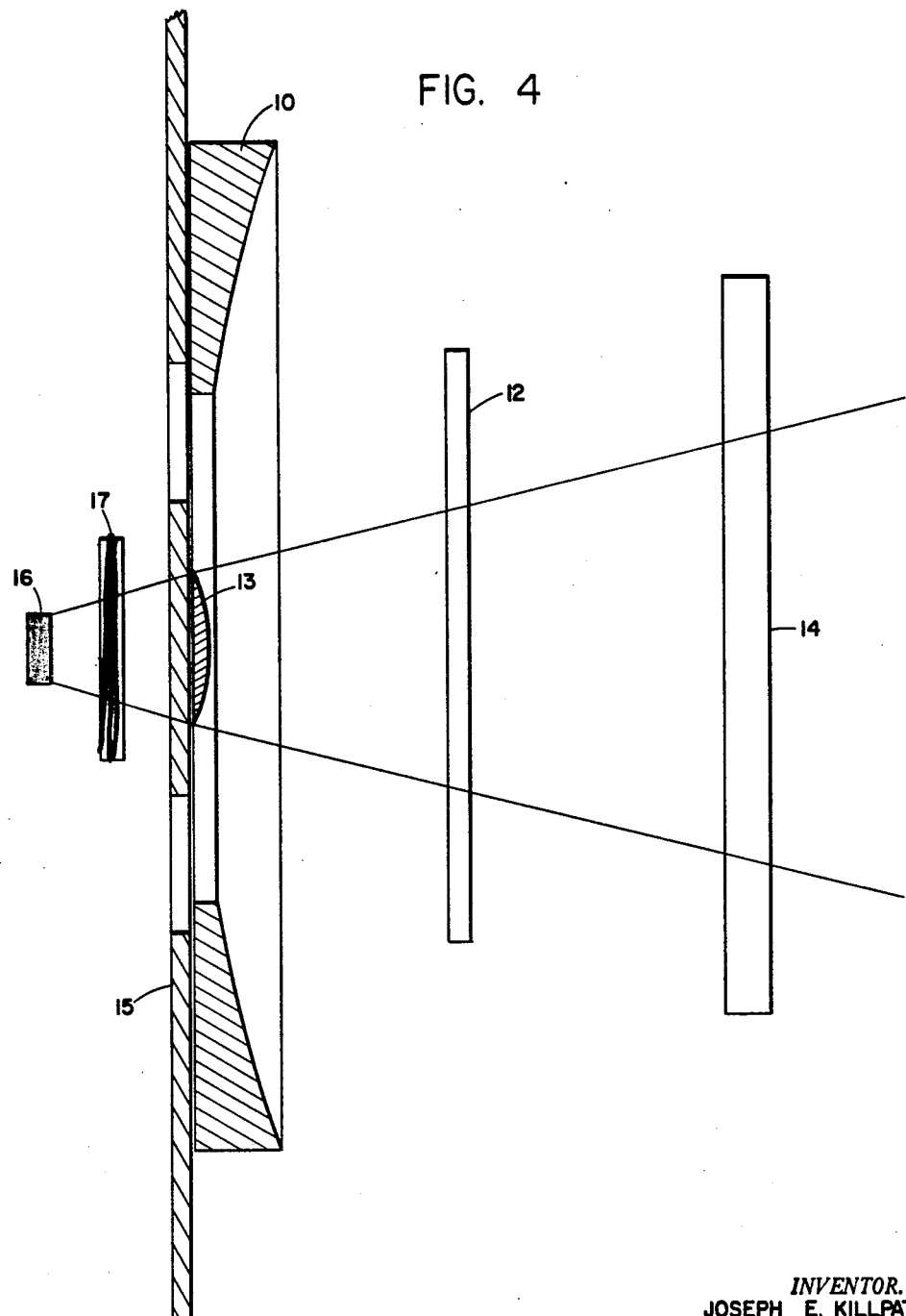

Nov. 23, 1965   J. E. KILLPATRICK   3,219,642
INFRA-RED VIEWING SYSTEM
Filed Dec. 20, 1961   5 Sheets-Sheet 5

INVENTOR.
JOSEPH E. KILLPATRICK
BY
ATTORNEY.

United States Patent Office 3,219,642
Patented Nov. 23, 1965

3,219,642
INFRA-RED VIEWING SYSTEM
Joseph E. Killpatrick, Minneapolis, Minn., assignor to Honeywell Inc., Minneapolis, Minn., a corporation of Delaware
Filed Dec. 20, 1961, Ser. No. 160,742
11 Claims. (Cl. 250—83.3)

This invention relates to the field of optical instruments, and more particularly to apparatus for detecting the presence of an object, in a field of observation, by the change which its presence makes in the infrared energy received from the field. The "object" may be a discrete body, such as a star, a power plant, or an island, or it may be a discontinuity in the general field, such as a temperature gradient in a heated metal, the border between colored and uncolored portions of a web, or the wake of a vessel in the ocean. The presence of such an object, which I shall refer to broadly as an observable datum, is in general detected as an anomaly in the field of observation. The latter preferably has a uniform observable characteristic, namely infrared radiance, although in special cases it is possible to use particular nonuniform fields and compensate for the known irregularities therein.

I have discovered that if alternately larger and smaller portions of the field are observed in a suitable fashion, the intrusion of an observable datum does not in general cause the same proportion of change in the observed characteristics of the two portions. It is understood that the anomaly in question must be significant, either in extent or in intensity, to produce a perceptible change in the observed characteristic of at least one portion of the field. These portions are preferably of regular outline and homocentric, and the apparatus is preferably so arranged that in the absence of any anomaly the energization supplied from the two portions of the field to a detecting device is the same, or at least in known relation.

My invention includes among its objects to provide improved object detecting apparatus, to provide apparatus responsive to the presence of an observable datum as an anomaly in a field having an observable characteristic, and to provide means for observing first a larger and then a smaller portion of a field and comparing the infrared energy received from said portions.

Various other objects, advantages, and features of novelty not individually enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 5:
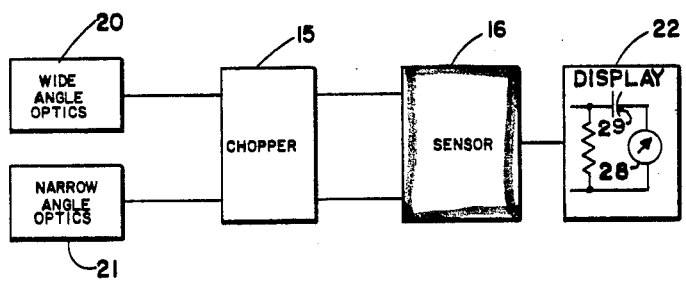
Figure 6:
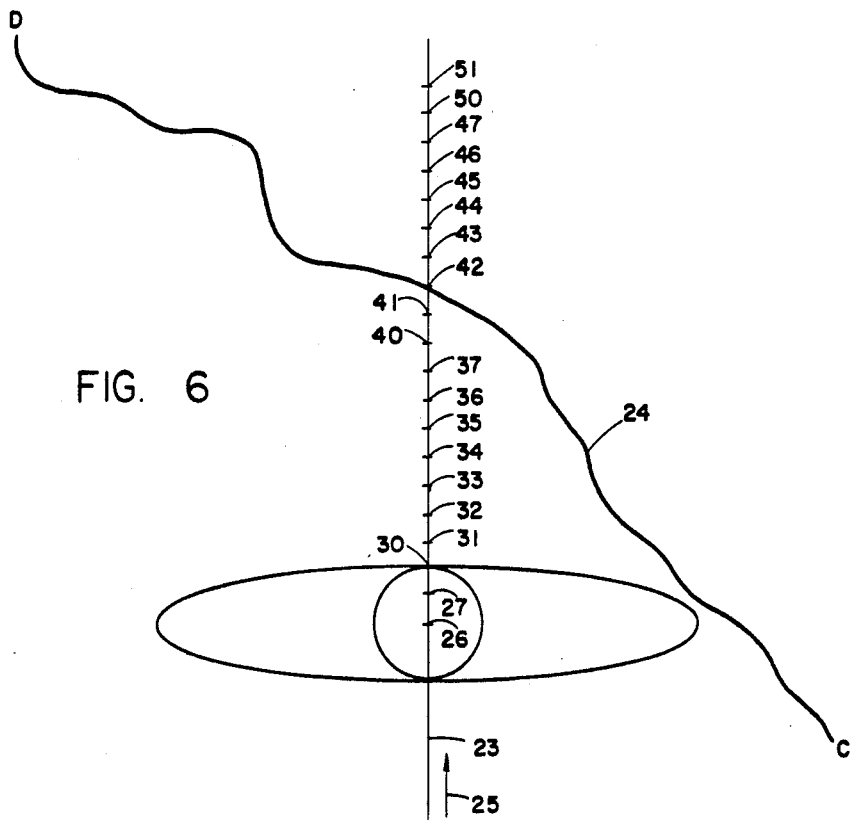
Figure 7:
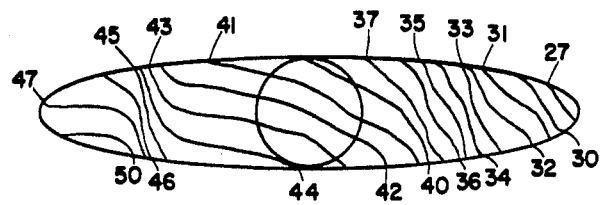

In the drawing, FIGURE 1 is a schematic perspective view of apparatus according to my invention;

FIGURE 2 is a view of the apparatus looking upward from the plane upper surface of the lower lens in FIGURE 1;

FIGURES 3 and 4 are mutually perpendicular longitudinal sections through the optical axis of the apparatus, as identified by the lines 3—3 and 4—4 in FIGURE 2;

FIGURE 5 shows the electrical circuitry of my invention in block diagram form; and FIGURES 6 and 7 show the areas observed by the two optical systems comprised in the apparatus.

In FIGURE 1 the apparatus is shown as having an optical axis OA, the point O defining the location of an infrared sensor omitted from the figure for increased clarity of illustration. Axis OA is common to a pair of optical systems, one contained within the other. The first system includes a hollow parabolic reflector 10 and a pair of plane parallel mirrors 11 and 12. The second system includes a pair of crossed cylindrical lenses 13 and 14, made of silver chloride for increased infrared transparency. The sensor may comprise a lead sulfide infrared detector.

At a point on the optical axis remote from point O the field observed using reflector 10 is circular, while that observed using lenses 13 and 14 is elliptical. As suggested in FIGURE 6, the focal lengths of the lenses and the reflector are so chosen, with respect to their other dimensions, that a diameter of the circle is the minor axis of the ellipse, which is accordingly homocentric with the circle. The major axis of the ellipse is five times the minor one. The effective numerical apertures of the lenses and the reflector are such that, for a field of uniform intensity, the same amounts of infrared energy reach the sensor through the lenses and from the reflector, that is, the optical gain of the reflection system is greater than that of the lens system. Note that light from the mirrors does not pass through the smaller lens, but goes around it, in reaching the sensor.

A chopper disc 15 rotates between the sensor and the lens and reflector. This is best shown in FIGURE 2, which is a view taken looking upwardly from the upper, plane surface of lens 14, the position of which is suggested in broken lines in FIGURE 2. The outer portion of disc 15 is provided with apertures in three rings. All the apertures are 20° in angular extent, and the outer and inner rings have their apertures in radial alignment and spaced by 20°. The intermediate ring has its apertures aligned with portions of the disc between the apertures in the inner and outer rings. The arrangement is such that energy from the small lens 13 passes through the intermediate ring of apertures, while energy from mirrors 11 and 12 passes through the outer and inner rings, respectively. The sensor is behind lens 13 and is indicated by the broken circle 16, and a filter 17 may be located between the sensor and disc 15 so that all energy reaching the sensor must pass through it. The sensor may comprise a lead sulfide infrared detector as indicated in FIGURE 5 by the reference numeral 16.

FIGURE 5 shows the electrical circuit associated with my invention, in block diagram form. Infrared energy is transmitted to detector 16, through chopper 15, alternately from the wide angle optics 20, comprising mirrors 11 and 12 and reflector 10, and from the narrow angle optics 21, comprising lenses 13 and 14. The output from detector 16 is supplied to a display 22, in which the signals representing the two optical inputs are compared and an indication is given of their relationship. The degree of complexity of display 22 is determined by the use to be made of the signal and the sensitivity required. In its simplest form it may comprise no more than an A.C. voltmeter 28 preceded by suitable means such as capacitor 29 for removing the D.C. component.

FIGURE 6 is a diagram illustrating one use of my invention. Here the straight line 23 represents the course of an aircraft carrying my apparatus, and the irregular line 24 represents a coast line, the land area being above line 24 and the aircraft moving in the direction indicated by the arrow 25. When the aircraft is at point 26 the observed circular and elliptical areas are both homogeneous, as far as infrared radiance is concerned, and the energy reaching the detector through optics 20 is equal to that reaching it through optics 21. A zero indication appears at the display 22.

When the aircraft advances to point 27 a small portion of the land area is within the elliptical field, as is shown in FIGURE 7 by the curve numbered 27, and this changes the total infrared energization received by detector 16 through optics 20. The energy received through optics 21 remains the same, so that display 22 indicates a small difference. As the aircraft continues in flight the line 24 appears to move across the observable area as indicated by successive lines 30, 31, 32, etc. in FIGURE 7, which correspond to positions of the aircraft on the line 23 identified by the same numbers. It will be clear that up until point 37 is passed the ellipse only has been increasingly affected and that by the time point 44 is reached the circle has been totally affected. Somewhere between points 41 and 43 both the circle and the ellipse are equally affected; when this happens the display is again zero, but this is of course only a transitory state. For a traverse of the aircraft from point 26 to point 51 the display gives an indication which increases from zero to a first maximum, decreases to zero, then increases to a second maximum, after which it again returns to zero, the intermediate zero being momentary.

Thus even with the rudimentary display described, it is possible to determine when the aircraft is passing from one medium to another, and the principle is applicable to related problems in the mechanical arts.

Returning to the geographical application of my invention, it will be apparent that the same type of operation takes place if the anomaly being observed is of a dimension smaller than that of the circle, such as a small island, or the extended but relatively narrow wake of a vessel. It may not however be so apparent that the apparatus may also be used to detect an essentially dimensionless anomaly, such as a star against a starless sky. This operation is possible because the optical gains of the two optics are different, and even when a star is in both the circular and elliptical areas of observation the energy received from the reflector is greater than the received through the lens, and a differential output is supplied by detector. The operation of the system is thus such that it will detect any difference in the average brightness of the two fields of view and with proper design the sign of this difference can be determined. It will be understood that by increasing the complexity of the display, increased use may be made of the system. Such modifications might include a detector synchronized with the chopper, a scanning mount for the optics, replication of system components to compensate for solar reflection, and other refinements. By their use my apparatus may be employed to cause an aircraft to follow a coast line or to cause a telescope to follow a star, as two exemplary illustrations.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. Means for detecting the presence of an observable datum as an anomaly in a field having an observable characteristic comprising, in combination: coaxial optical means alternately observing homocentric portions of said field of larger and smaller extent and giving outputs determined by the values of said characteristic in said portions; means comparing said outputs to give a further output having a predetermined value when no such datum exists in said field; and means giving an indication when the valve of said further output departs from said predetermined value.

2. Means for detecting the presence of an observable datum as an anomaly in a field having a uniform observable characteristic comprising, in combination: homocentric optical means alternately observing homocentric portions of said field of larger and small extent and giving outputs determined by the values of said characteristic in said portions; means comparing said outputs to give a further output having a predetermined value which is zero when no such datum exists in said field; and means giving an indication when the value of said further output departs from said predetermined value.

3. Means for detecting the presence of an observable datum as an anomaly in a field having a characteristic of normally uniform value comprising, in combination: means alternately observing homocentric portions of said field of different extents and giving outputs determined by the values of said characteristic in said portions; means comparing alternate values of said outputs; and means giving a further output when said values are not in a predetermined relationship.

4. Means for detecting the presence of an observable datum as an anomaly in the normally uniform electromagnetic radiation from a field in which said datum may appear comprising, in combination: coaxial optical means alternately observing first a smaller portion of said field and then a larger portion of said field including all of said smaller portion, and giving outputs determined by the mean values of said radiation from said portions; means comparing said outputs to give a further output which is zero when no such datum is present; and means giving an indication when said further output departs from zero.

5. In combination: an infrared sensor giving an electric output in accordance with the electromagnetic energization thereof; a first optical system for forming in the plane of said sensor a first image of a first portion of a field to be observed; a second optical system for forming in the plane of said sensor a second image of a second portion of said field which includes all of said first portion; means alternately obscuring first said first image and then said second image; means comparing the output of said sensor when said first image is obscured with said output when said second image is obscured; and means giving a further output when the sensor outputs do not have a predetermined relationship.

6. Apparatus according to claim 5 in which the effective numerical apertures of said systems are such that the energization of said sensor is the same from both said optical systems when viewing a uniform radiant source.

7. In combination: a detector of electromagnetic radiation; a first optical system for energizing said detector with radiant energy from a first selected area of a field to be observed; a second optical system co-axial with and contained within said first system for energizing said detector with radiant energy from a second selected area of said field which includes all of said first area; a chopper for alternately and cyclically preventing first one and then the other of said systems from energizing said detector; and means comparing the outputs of said detector when energized from said optical systems.

8. In combination: an infrared sensor; a first optical system including an annular parabolic mirror and a pair of laterally spaced plane mirrors for energizing said sensor with infrared energy from a first selected area of a field to be observed; a second optical system coaxial with and contained within said first system, and including a pair of crossed cylindrical lenses of silver chloride, for energizing said sensor with infrared energy from a second selected area of said field which includes said first area; a chopper for alternately and cyclically preventing one and then the other of said systems from energizing said sensor; and means comparing the outputs of said sensor when energized from said optical systems.

9. In combination: a detector of electromagnetic radiation; a first optical system for energizing said detector with radiant energy from a first selected area of a field to be observed; a second optical system coaxial with and contained within said first system for energizing said detector with radiant energy from a second selected area of said field which includes said first area, one of said optical systems comprising a parabolic reflector folding mirror means; a chopper for alternately and cyclically preventing first one and then the other of said systems from energizing said detector; and means comparing the outputs of said detector when energized from said optical systems.

10. Apparatus according to claim 9 in which one of said systems includes a pair of infrared transparent crossed cylindrical lenses.

11. In combination: a detector of electromagnetic radiation; a first optical system for energizing said detector with radiant energy from a first selected area of a field to be observed; a second optical system coaxial with and contained within said first system for energizing said detector with radiant energy from a second selected area of said field which includes said first area, one of said systems including a pair of infrared transparent crossed cylindrical lenses; a chopper for alternately and cyclically preventing first one and then the other of said systems from energizing said detector; and means comparing the outputs of said detector when energized from said optical systems.

References Cited by the Examiner
UNITED STATES PATENTS

| | | | |
|---|---|---|---|
| 2,923,202 | 2/1960 | Trimble | 250—203 X |
| 2,985,783 | 5/1961 | Garbuny et al. | 250—83.3 X |
| 3,081,632 | 3/1963 | Howell | 250—83.3 |
| 3,097,298 | 7/1963 | Astheimer et al. | 250—83.3 |
| 3,151,247 | 9/1964 | Auvermann | 250—83.3 |

RALPH G. NILSON, *Primary Examiner.*

ARCHIE R. BORCHELT, *Examiner.*